United States Patent
Chang et al.

(10) Patent No.: US 10,549,234 B2
(45) Date of Patent: Feb. 4, 2020

(54) WET DESULFURIZATION APPARATUS CAPABLE OF IMPROVING DESULFURIZATION EFFICIENCY AND WET DESULFURIZATION METHOD USING THE SAME

(71) Applicant: DOOSAN HEAVY INDUSTRIES & CONSTRUCTION CO., LTD., Changwon-si, Gyeongsangnam-do (KR)

(72) Inventors: In Gab Chang, Yongin-si (KR); Min Su Paek, Yongin-si (KR); Jeong Seok Yoo, Yongin-si (KR); Joon Ho Kim, Yongin-si (KR)

(73) Assignee: Doosan Heavy Industries Construction Co., Ltd, Gyeongsangnam-do (KR)

( * ) Notice: Subject to any disclaimer, the term of this patent is extended or adjusted under 35 U.S.C. 154(b) by 0 days.

(21) Appl. No.: 16/223,028

(22) Filed: Dec. 17, 2018

(65) Prior Publication Data

US 2019/0184335 A1 Jun. 20, 2019

(30) Foreign Application Priority Data

Dec. 19, 2017 (KR) .................. 10-2017-0174931
Dec. 19, 2017 (KR) .................. 10-2017-0174932

(51) Int. Cl.
*B01D 53/26* (2006.01)
*B01D 53/34* (2006.01)
(Continued)

(52) U.S. Cl.
CPC .......... *B01D 53/504* (2013.01); *B01D 53/26* (2013.01); *B01D 53/346* (2013.01);
(Continued)

(58) Field of Classification Search
CPC .... B01D 53/50; B01D 53/501; B01D 53/504; B01D 53/78; B01D 2257/302;
(Continued)

(56) References Cited

U.S. PATENT DOCUMENTS 4,174,375 A * 11/1979 Holehouse ............. B01D 53/34
423/240 R
4,853,010 A * 8/1989 Spence .................. B03C 3/017
96/52

(Continued)

FOREIGN PATENT DOCUMENTS

JP 06-285326 A 10/1994
JP 08-281055 A 10/1996
(Continued)

OTHER PUBLICATIONS

A Korean Office Action dated Dec. 19, 2018 in connection with Korean Patent Application No. 10-2017-0174931 which corresponds to the above-referenced U.S. application.
(Continued)

*Primary Examiner* — Timothy C Vanoy
(74) *Attorney, Agent, or Firm* — Invenstone Patent, LLC

(57) ABSTRACT

A wet desulfurization apparatus includes a chamber enclosing a space for passing flue gas and including a tubular barrier partitioning the space into an inner chamber region having a first volume and an outer chamber region surrounding the inner chamber region and having a second volume, a flue gas inlet to introduce raw flue gas into the outer chamber region, and a flue gas outlet to discharge desulfurized flue gas from the inner chamber region; a slurry reservoir disposed under the chamber to receive and store an alkaline slurry; first and second sprayers to spray the alkaline slurry into the outer and inner chamber regions, respectively, in order to remove sulfur from the flue gas in the corresponding chamber region; and a demister disposed in
(Continued)

the inner chamber region between the second sprayer and the flue gas outlet to remove mist from the flue gas in the inner chamber region.

14 Claims, 12 Drawing Sheets

(51) Int. Cl.
*B01D 53/50* (2006.01)
*B01D 53/80* (2006.01)

(52) U.S. Cl.
CPC ........... *B01D 53/505* (2013.01); *B01D 53/80* (2013.01); *B01D 2251/404* (2013.01); *B01D 2251/606* (2013.01); *B01D 2257/302* (2013.01); *B01D 2257/80* (2013.01)

(58) Field of Classification Search
CPC .............. B01D 2258/0283; B01J 10/00; B01J 19/0053; B01J 19/24; B01J 19/244; B01J 19/246; B01J 19/248; B01J 2219/00761; B01J 2219/2401
See application file for complete search history.

(56) References Cited

U.S. PATENT DOCUMENTS

| | | | | |
|---|---|---|---|---|
| 5,314,666 A | * | 5/1994 | Palomares | B01D 53/18 |
| | | | | 202/158 |
| 5,648,022 A | * | 7/1997 | Gohara | B01D 53/504 |
| | | | | 261/17 |
| 6,280,505 B1 | * | 8/2001 | Torkildsen | B01D 53/1456 |
| | | | | 95/216 |
| 2008/0050306 A1 | * | 2/2008 | Keller | C01B 17/0439 |
| | | | | 423/574.1 |
| 2018/0001253 A1 | * | 1/2018 | Kaseda | B01D 53/1425 |

FOREIGN PATENT DOCUMENTS

| | | |
|---|---|---|
| JP | 2004321868 A | 11/2004 |
| KR | 10-0906805 B1 | 7/2009 |
| KR | 10-2016-0067209 A | 6/2016 |
| KR | 10-1774774 B1 | 9/2017 |
| KR | 10-1782786 B1 | 10/2017 |
| KR | 10-1794628 B1 | 11/2017 |

OTHER PUBLICATIONS

A Korean Office Action dated Dec. 19, 2018 in connection with Korean Patent Application No. 10-2017-0174932 which corresponds to the above-referenced U.S. application.

* cited by examiner

WET DESULFURIZATION APPARATUS CAPABLE OF IMPROVING DESULFURIZATION EFFICIENCY AND WET DESULFURIZATION METHOD USING THE SAME

CROSS REFERENCES TO RELATED APPLICATIONS

The present application claims priority to Korean Patent Application Nos. 10-2017-0174931, filed Dec. 19, 2017, and 10-2017-0174932, filed Dec. 19, 2017, the entire content of which is incorporated herein for all purposes by this reference.

BACKGROUND OF THE DISCLOSURE

1. Field of the Disclosure

The present invention relates to a wet desulfurization apparatus capable of improving desulfurization efficiency and a wet desulfurization method using the same. More particularly, the present invention relates to a wet desulfurization apparatus, in which the chamber of the desulfurization apparatus is partitioned into an inner chamber region and an outer chamber region and the flow rate of flue gas and the amount of alkaline slurry that is sprayed are adjusted during desulfurization, thereby improving desulfurization efficiency, and to a wet desulfurization method using the same.

2. Description of the Background Art

A wet desulfurization apparatus using limestone ($CaCO_3$) is mainly utilized in the treatment of sulfur oxide ($SO_x$) and acid gas contained in flue gas. Limestone is an alkaline material that is abundant in Korea, and is widely applied in desulfurization because it is relatively inexpensive compared to alternatives such as caustic soda (NaOH). Thus, large facilities tend to use wet desulfurization apparatuses, which, while somewhat high in initial investment costs, are advantageous in that operating and maintenance costs are low.

In a contemporary wet desulfurization apparatus, alkaline slurry is recycled and re-sprayed. Untreated gas is introduced to the desulfurization apparatus, after which acid gas is absorbed through gas-liquid contact in the chamber, and the absorbed acid gas is treated in the following reaction sequences using the alkaline slurry.

$$SO_2(g) + H_2O \rightarrow H_2SO_3(aq) \quad (1)$$

$$H_2SO_3(aq) \leftrightarrow H^+ + HSO_3^- \leftrightarrow 2H^+ + SO_3^{2-} \quad (2)$$

$$Ca^{2+} + SO_3^{2-} \leftrightarrow CaSO_3 \quad (3)$$

Here, sulfur oxide ($SO_x$) absorbed by the alkaline slurry is produced again into gypsum ($CaSO_4.2H_2O$) through the following process steps.

$$O_2(g) \rightarrow O_2(aq) \quad (4)$$

$$HSO_3^- + \tfrac{1}{2}O_2 \rightarrow H^+ + SO_4^{2-} \quad (5)$$

$$SO_4^{2-} + \tfrac{1}{2}O_2 \rightarrow SO_4^{2-} \quad (6)$$

$$CaCO_3(s) + 2H^+ \rightarrow Ca^{2+} + H_2O + CO_2 \quad (7)$$

$$Ca^{2+} + SO_3^{2-} + \tfrac{1}{2}H_2O \rightarrow CaCO_3.\tfrac{1}{2}H_2O(s) \quad (8)$$

$$Ca^{2+} + SO_4^{2-} + 2H_2O \rightarrow CaSO_4.2H_2O(s) \quad (9)$$

Meanwhile, there is a difference between the pH concentration for removing sulfur oxide from the flue gas and the pH concentration for increasing the gypsum purity. It is known that, typically, when the pH of the slurry in the wet desulfurization apparatus falls in the range of 4.0 to 5.0, the quality of gypsum is improved but the $SO_2$ absorption rate is decreased, and when the pH is maintained at 5.0 or more, the $SO_2$ absorption rate improves but the quality of gypsum deteriorates.

Accordingly, the contemporary wet desulfurization apparatus operates by stirring the slurry using an agitator and circulating the stirred slurry. In doing so, the slurry is sprayed into flue gas that flows along a single path, in an upward direction, which contributes to a lowering of desulfurization efficiency.

Hence, it is necessary to develop a wet desulfurization apparatus capable of improving desulfurization efficiency.

SUMMARY OF THE DISCLOSURE

Accordingly, the present invention has been made keeping in mind the problems encountered in the related art, and the present invention is intended to provide a wet desulfurization apparatus capable of improving desulfurization efficiency, and to provide a wet desulfurization method using the same.

In the wet desulfurization apparatus according to the present invention, a chamber is partitioned by means of a tubular barrier into an inner chamber region and an outer chamber region, and the flow rate of flue gas and the amount of alkaline slurry that are sprayed are adjusted during desulfurization, thereby improving desulfurization efficiency.

Specifically, the flow rate of flue gas subjected to primary desulfurization is adjusted slowly, a slurry spray part (a spray pipe) is provided in the form of a multi-tiered structure, and the amount of slurry that is transferred to the spray pipe of each tier is varied, thereby improving desulfurization efficiency.

Here, the effects of the present invention are not limited to those described above, and other effects not mentioned herein will be clearly understood by those skilled in the art from the description of the specific embodiments for carrying out the present invention.

According to an aspect of the present invention, a wet desulfurization apparatus may include a chamber enclosing a space for passing flue gas and including a tubular barrier partitioning the space into an inner chamber region having a first volume and an outer chamber region surrounding the inner chamber region and having a second volume, a flue gas inlet configured to introduce raw flue gas into the outer chamber region, and a flue gas outlet configured to discharge desulfurized flue gas from the inner chamber region; a slurry reservoir disposed under the chamber and configured to receive and store an alkaline slurry; a first sprayer disposed in the outer chamber region and configured to receive the stored alkaline slurry and to spray the received alkaline slurry into the outer chamber region in order to remove sulfur (S) from the flue gas in the outer chamber region; a second sprayer disposed in the inner chamber region and configured to receive the stored alkaline slurry and to spray the received alkaline slurry into the inner chamber region in order to remove sulfur (S) from the flue gas in the inner chamber region; and a demister disposed in the inner chamber region between the second sprayer and the flue gas outlet and configured to remove mist from the flue gas in the inner chamber region. Here, the first volume may be greater than the second volume.

The flue gas in the outer chamber region may form a descending air current that passes over the tubular barrier to form an ascending air current in the inner chamber region.

Each of the first and second sprayers may include a spray pipe communicating with the slurry reservoir and having multiple spray nozzles so as to spray the alkaline slurry supplied from the slurry reservoir.

The demister may include an upper support frame fixed to an inner wall of the inner chamber region of the chamber; a lower support frame fixed to the inner wall of the inner chamber region of the chamber; and a plurality of corrugated plates spaced apart from each other, each corrugated plate having an upper end joined to the upper support frame and a lower end joined to the lower support frame. Each of the corrugated plates may include a crest plate extending vertically and protruding in a first direction; a valley plate extending vertically and protruding in a second direction opposite to the first direction; a plate fastener extending vertically to fasten the upper end of the corrugated plate to the upper support frame and to fasten the lower end of the corrugated plate to the lower support frame; and a plurality of coupling plates extending obliquely to couple the plate fastener to each of the crest plate and the valley plate and to couple the crest plate and the valley plate to each other.

The demister may further include a demisting pipe communicating with the slurry reservoir; and multiple spray nozzles disposed along the demisting pipe to spray the alkaline slurry downward in order to remove mist attached to the upper support frame, the lower support frame, and the corrugated plates.

The wet desulfurization apparatus may further include a slurry transfer controller for controlling an amount of the alkaline slurry being transferred from the slurry reservoir to at least one of the first sprayer, the second sprayer, and the demister.

According to another aspect of the present invention, there is provided a method for removing sulfur (S) from flue gas using the above wet desulfurization apparatus. The method may include introducing raw flue gas into the outer chamber region to form a descending air current of the flue gas in the outer chamber region and to form an ascending air current of the flue gas in the inner chamber region that is introduced via the outer chamber region; first spraying the stored alkaline slurry into the outer chamber region, to remove sulfur from the flue gas forming the descending air current and having a first flow rate; second spraying the stored alkaline slurry into the inner chamber region, to remove sulfur from the flue gas forming the ascending air current and having a second flow rate; and removing mist from the flue gas that has undergone the second spraying. Here, the first flow rate may be higher than the second flow rate. Moreover, since the above wet desulfurization apparatus may further include a plurality of sprayers respectively communicating with the slurry reservoir and forming a multi-tiered structure arranged vertically in the inner chamber region along a flow direction of the flue gas in the inner chamber region, each sprayer configured to spray the received alkaline slurry into the inner chamber region in order to remove sulfur (S) from the flue gas in the inner chamber region, the above method may further include controlling an amount of the alkaline slurry being transferred from the slurry reservoir to each sprayer such that a higher-positioned sprayer of the multi-tiered structure receives more alkaline slurry than a lower-positioned sprayer of the multi-tiered structure.

According to another aspect of the present invention, a wet desulfurization apparatus may include a chamber enclosing a space for passing flue gas and including a tubular barrier partitioning the space into an inner chamber region having a first volume and an outer chamber region surrounding the inner chamber region and having a second volume, a flue gas inlet configured to introduce raw flue gas into the inner chamber region, and a flue gas outlet configured to discharge desulfurized flue gas from the outer chamber region; a slurry reservoir disposed under the chamber and configured to receive and store an alkaline slurry; a first sprayer disposed in the inner chamber region and configured to receive the stored alkaline slurry and to spray the received alkaline slurry into the inner chamber region in order to remove sulfur (S) from the flue gas in the inner chamber region; a second sprayer disposed in the outer chamber region and configured to receive the stored alkaline slurry and to spray the received alkaline slurry into the outer chamber region in order to remove sulfur (S) from the flue gas in the outer chamber region; and a demister disposed in the outer chamber region between the second sprayer and the flue gas outlet and configured to remove mist from the flue gas in the outer chamber region. Here, the second volume may be greater than the first volume. Thus, the flue gas in the inner chamber region may form a descending air current that passes over the tubular barrier to form an ascending air current in the outer chamber region. Also, the demister may include an upper support frame fixed to an inner wall of the outer chamber region of the chamber; a lower support frame fixed to the inner wall of the outer chamber region of the chamber; and a plurality of corrugated plates spaced apart from each other, each corrugated plate having an upper end joined to the upper support frame and a lower end joined to the lower support frame.

According to another aspect of the present invention, there is provided a method for removing sulfur (S) from flue gas using the above wet desulfurization apparatus. The method may include introducing raw flue gas into the inner chamber region to form a descending air current of the flue gas in the inner chamber region and to form an ascending air current of the flue gas in the outer chamber region that is introduced via the inner chamber region; first spraying the stored alkaline slurry into the inner chamber region, to remove sulfur from the flue gas forming the descending air current and having a first flow rate; second spraying the stored alkaline slurry into the outer chamber region, to remove sulfur from the flue gas forming the ascending air current and having a second flow rate; and removing mist from the flue gas that has undergone the second spraying. Here, the first flow rate may be higher than the second flow rate. Moreover, since the above wet desulfurization apparatus may further include a plurality of sprayers respectively communicating with the slurry reservoir and forming a multi-tiered structure arranged vertically in the outer chamber region along a flow direction of the flue gas in the outer chamber region, each sprayer configured to spray the received alkaline slurry into the outer chamber region in order to remove sulfur (S) from the flue gas in the outer chamber region, the method may further include controlling an amount of the alkaline slurry being transferred from the slurry reservoir to each sprayer such that a higher-positioned sprayer of the multi-tiered structure receives more alkaline slurry than a lower-positioned sprayer of the multi-tiered structure.

As outlined above, the wet desulfurization apparatus of the present invention includes a chamber partitioned into two regions passing the flue gas in different directions. According to the spirit of the present invention, rather than a partitioning that specifically results in inner and outer chamber regions, the chamber of the wet desulfurization apparatus according to the present invention may be partitioned into any two chamber regions, such as first and second chamber regions, provided that one chamber region communicates with the flue gas inlet and passes the introduced flue gas to the other chamber region which communicates with the flue gas outlet to discharge the desulfurized flue gas. The flue gas in the chamber region that communicates with the flue gas inlet forms a descending air current, while the flue gas in the chamber region that communicates with the flue gas outlet forms an ascending air current. Therefore, the wet desulfurization apparatus according to the present invention may be provided with first and second chamber regions respectively passing flue gas flowing along a general path having a different (i.e., opposing) direction than the flue gas flowing in the other chamber region.

Moreover, the chamber region (e.g., a first chamber region) that communicates with the flue gas inlet and passes flue gas according to a descending path may be further partitioned into a plurality of first chamber sub-regions provided that the flue gas in each first chamber sub-region forms a generally descending air current from the flue gas inlet to the chamber region that communicates with the flue gas outlet and passes flue gas according to an ascending air current. Similarly, the chamber region (e.g., a second chamber region) that communicates with the flue gas outlet and passes flue gas according to an ascending path may be further partitioned into a plurality of second chamber sub-regions provided that the flue gas in each second chamber sub-region forms a generally ascending air current from the other chamber region (e.g., the first chamber region) to the flue gas outlet.

Therefore, the present invention further provides an apparatus for removing sulfur (S) from flue gas, and a method using the apparatus, in which the apparatus may include a chamber enclosing a space for passing flue gas and including one of: a first tubular barrier partitioning the space into an inner chamber region having a first volume and an outer chamber region surrounding the inner chamber region and having a second volume, the inner chamber region communicating with a flue gas outlet configured to discharge desulfurized flue gas according to an ascending air current in the inner chamber region and the outer chamber region communicating with a flue gas inlet configured to introduce raw flue gas into the chamber to initiate a descending air current in the outer chamber region; and a second tubular barrier partitioning the space into an inner chamber region having a first volume and an outer chamber region surrounding the inner chamber region and having a second volume, the outer chamber region communicating with a flue gas outlet configured to discharge desulfurized flue gas according to an ascending air current in the outer chamber region, and the inner chamber region communicating with a flue gas inlet configured to introduce raw flue gas into the chamber to initiate a descending air current in the inner chamber region. The wet desulfurization apparatus may further include a slurry reservoir disposed under the chamber and configured to receive and store an alkaline slurry; and a sprayer disposed in each of the inner and outer chamber regions and configured to receive the stored alkaline slurry and to spray the received alkaline slurry into a corresponding chamber region in order to remove sulfur from the flue gas in the corresponding chamber region. Here, the sprayers are effectively arranged in series wherein a first sprayer may be disposed in the descending air current and a second sprayer may be disposed in the ascending air current, which is downstream of the descending air current. Thus, the wet desulfurization apparatus may further include a demister disposed between the flue gas outlet and the second sprayer and configured to remove mist from the flue gas that has undergone the spraying of the second sprayer.

DETAILED DESCRIPTION OF THE DISCLOSURE

Figure 1:
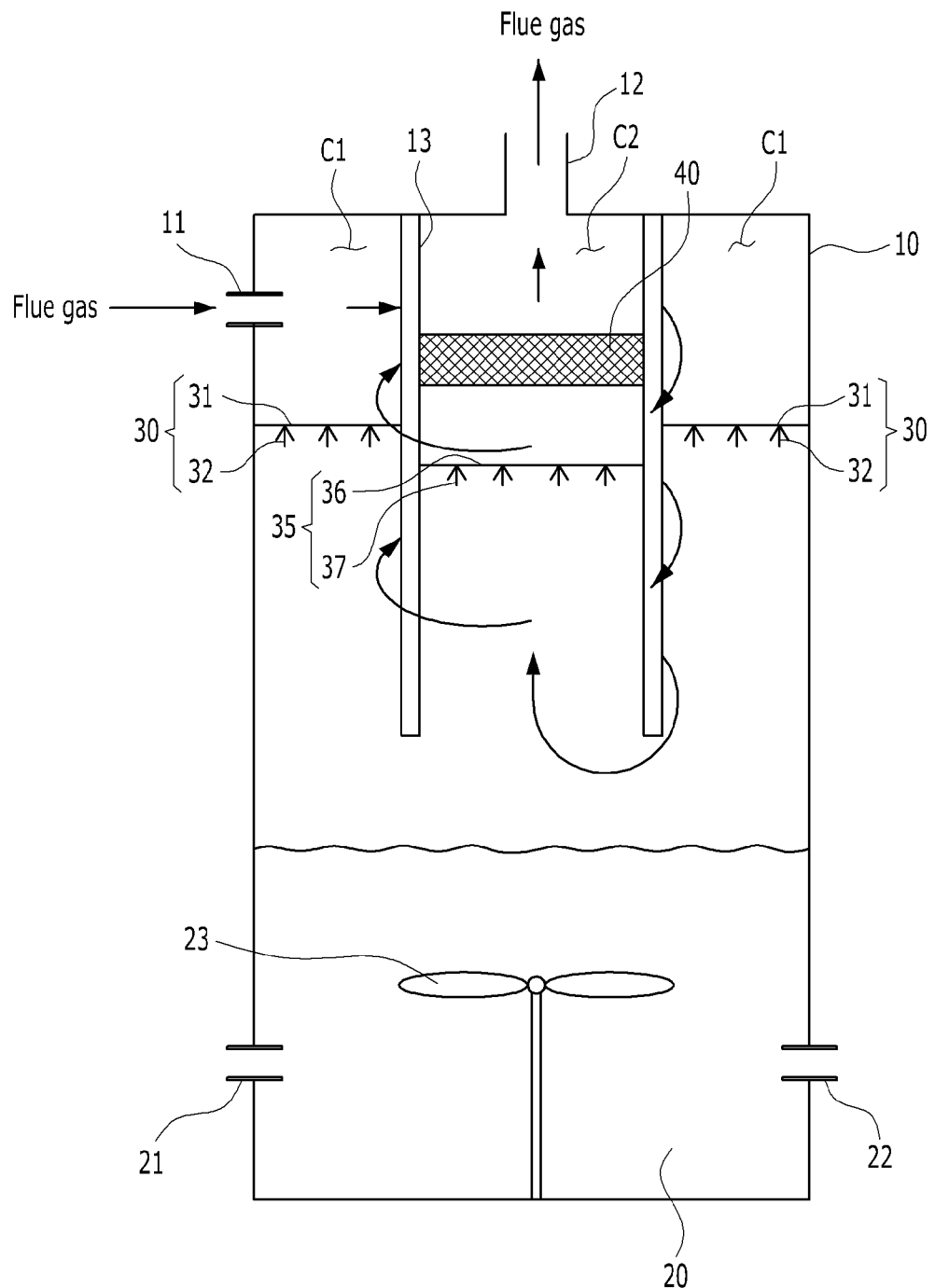
FIG. 1 is a schematic cross-section of a wet desulfurization apparatus according to an embodiment of the present invention.

Hereinafter, a detailed description will be given of the present invention with reference to the embodiments of the present invention and the drawings. These embodiments are merely set forth to illustrate the present invention but are not to be construed as limiting the scope of the present invention, as will be apparent to those skilled in the art.

Unless otherwise defined, all terms including technical and scientific terms used herein have the same meanings as those commonly understood by one of ordinary skill in the art to which the present invention belongs. In the case where the meanings thereof conflict, the description including the definitions herein shall prevail.

In order to clearly illustrate the invention proposed in the drawings, parts not related to the description are omitted, and similar parts are denoted by similar reference numerals throughout the specification. It is also to be understood that when any part is referred to as "comprising" or "including" any element, it does not exclude other elements, but may further include other elements unless otherwise stated. As used herein, the term "part" refers to a "unit" or "block" responsible for a specific function.

The ordinals ("first", "second", etc.) in individual steps are used for the sake of description and do not explain the order of the steps. Individual steps may be performed differently from the described order unless the specific order is explicitly stated in context. That is, the individual steps may be performed in the described order or in the reverse order, or may be substantially simultaneously conducted.

Figure 2:
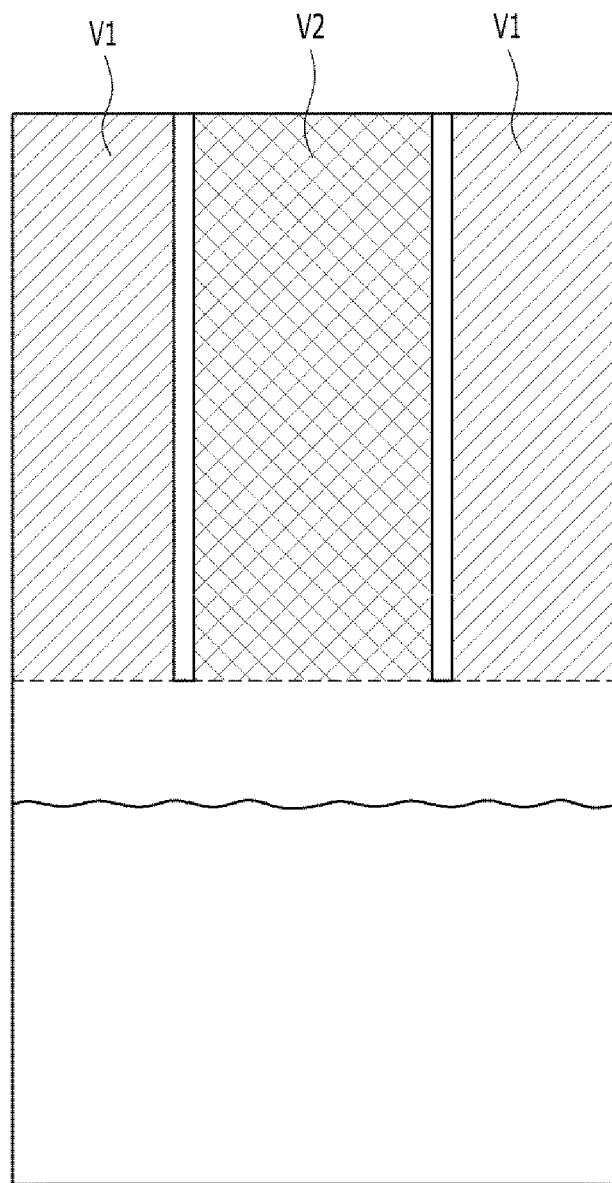
FIG. 2 is a schematic cross section of the chamber of FIG. 1 partitioned according to an exemplary embodiment.
Figure 3:
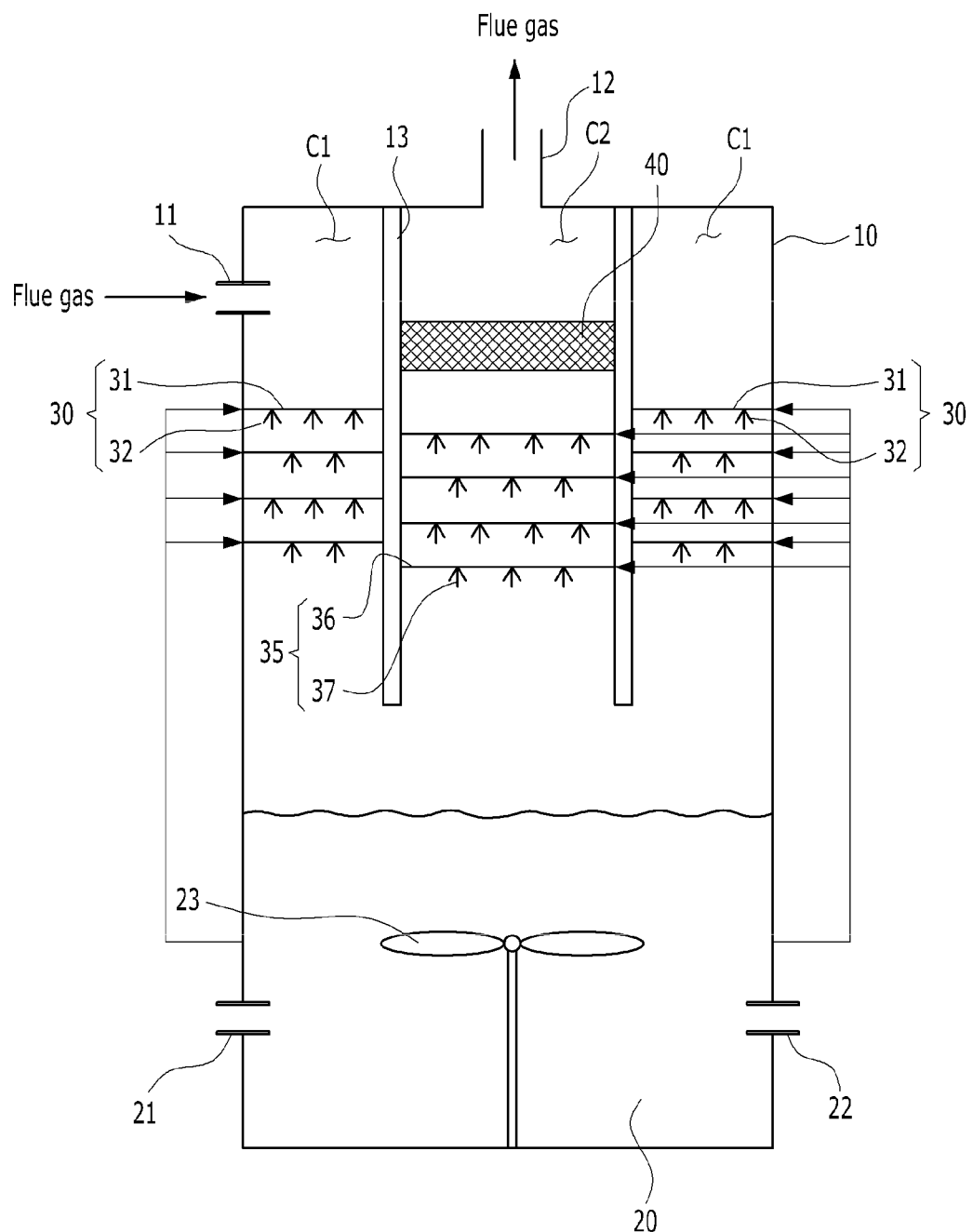
FIG. 3 is a schematic cross-section of a wet desulfurization apparatus according to an embodiment of the present invention.
Figure 4:
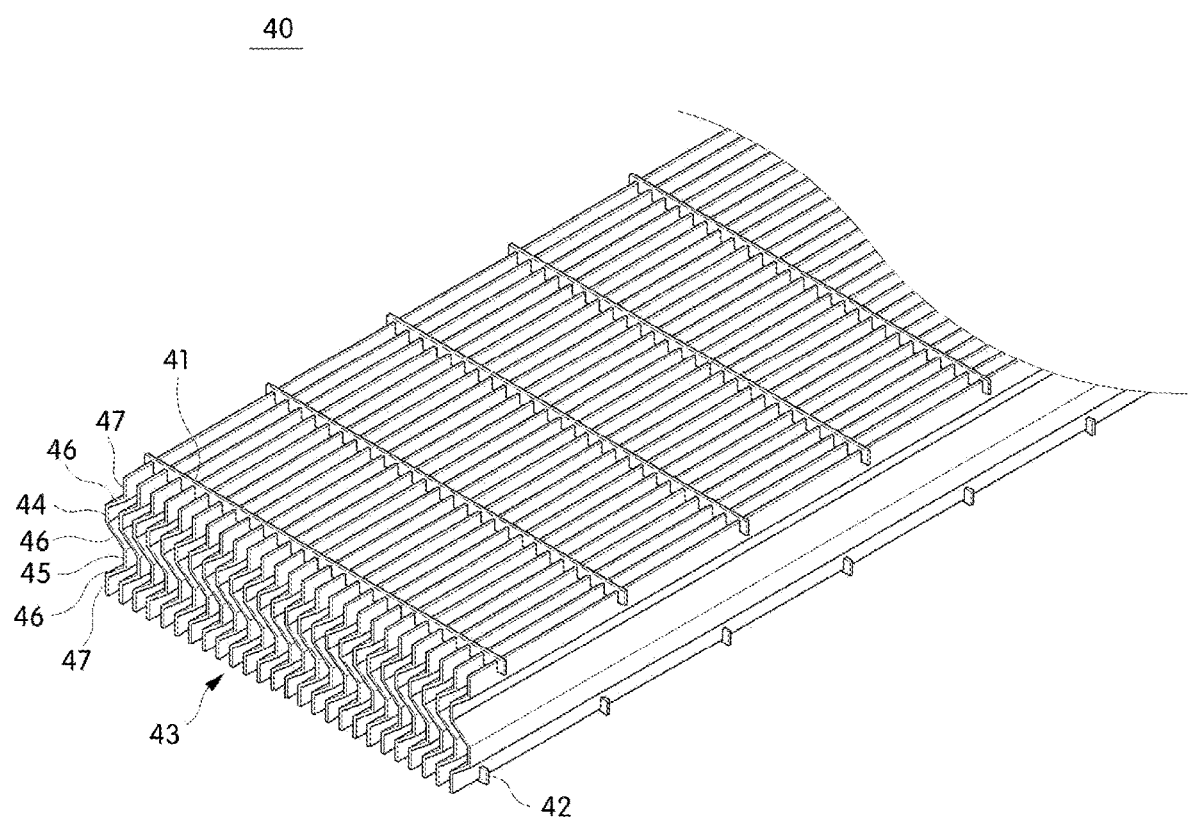
FIG. 4 is a perspective view of the demister of FIG. 1.
Figure 5:
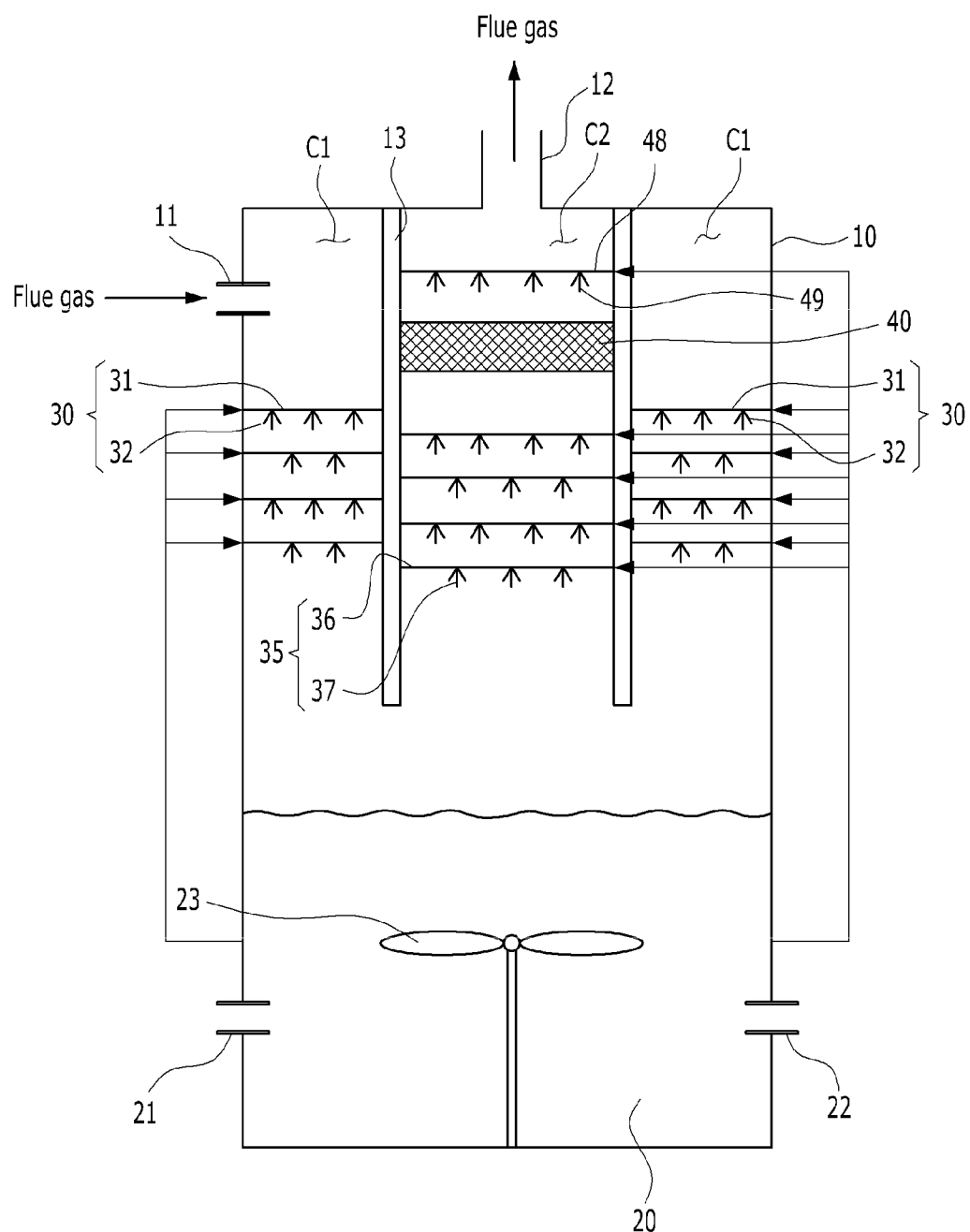
FIG. 5 is a schematic cross-section of a wet desulfurization apparatus according to an embodiment of the present invention.
Figure 6:
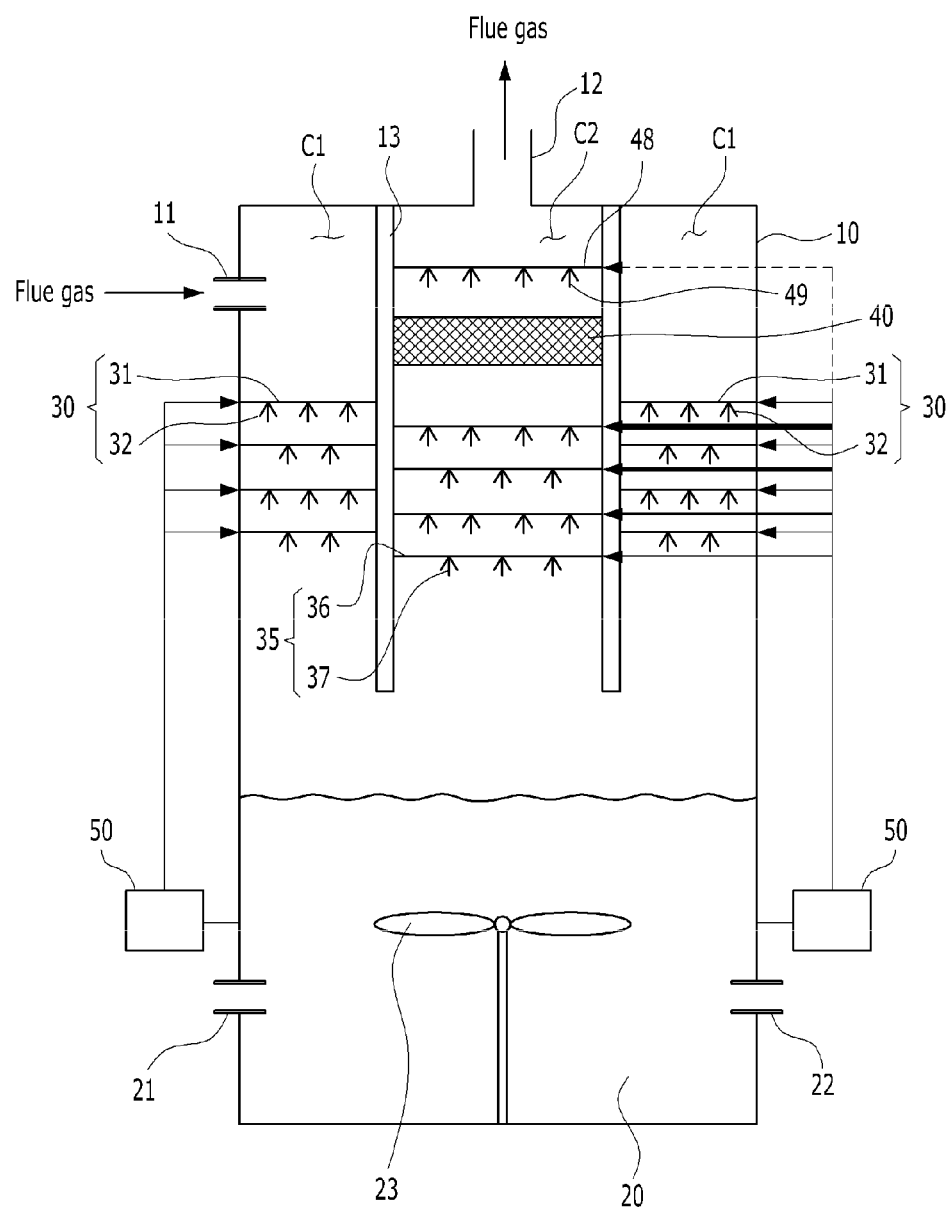
FIG. 6 is a schematic cross-section of a wet desulfurization apparatus according to an embodiment of the present invention.

FIGS. 1-6 illustrate a wet desulfurization apparatus according to a first embodiment of the present invention, with modifications of the first embodiment being shown in FIGS. 3, 5, and 6.

Referring to FIG. 1, the wet desulfurization apparatus according to the present invention may include: a chamber 10 enclosing an inner space and including a tubular bather 13 for partitioning the inner space into an inner chamber region C2 and an outer chamber region C1, a flue gas inlet 11 for introducing flue gas containing sulfur (S) to the outer chamber region C1, and a flue gas outlet 12 for discharging flue gas containing no sulfur (S) obtained through the inner chamber region C2; a slurry reservoir 20 disposed under the chamber 10 and configured to receive and store an alkaline slurry; a first sprayer 30 disposed in the outer chamber region C1 and configured to receive the alkaline slurry stored in the slurry reservoir 20 so as to spray the alkaline slurry to the flue gas; a second sprayer 35 disposed in the inner chamber region C2 and configured to receive the alkaline slurry stored in the slurry reservoir 20 so as to spray the alkaline slurry to the flue gas; a demister 40 disposed at the upper end of the inner chamber region C2 and configured to remove mist from flue gas containing no sulfur (S) obtained through the second sprayer 35, in which the flue gas containing sulfur is introduced to the flue gas inlet 11, sequentially passes through the outer chamber region C1 and the inner chamber region C2, and is then discharged from the flue gas outlet 12. Here, the cross section of the tubular barrier 13 is preferably circular but may be polygonal and may conform to the shape of the chamber 10.

In the present invention, the chamber 10 is partitioned by means of the tubular barrier 13 and is thus configured to include the inner chamber region C2 and the outer chamber region C1, and the flow rate of flue gas and the amount of alkaline slurry that is sprayed are adjusted during desulfurization, thereby improving desulfurization efficiency. Specifically, a contemporary wet desulfurization apparatus has a single path in an upward direction, whereas the wet desulfurization apparatus of the present invention is configured such that the introduced flue gas is subjected to primary desulfurization in a descending air current and is then subjected to secondary desulfurization in an ascending air current, thereby increasing desulfurization efficiency.

The chamber 10 includes the inner chamber region C2 and the outer chamber region C1 and is partitioned by the tubular barrier 13 arranged in a vertical direction (the up-and-down direction in FIG. 1). The chamber 10 further includes the flue gas inlet 11 configured to introduce flue gas containing sulfur (S) to the outer chamber region C1, and the flue gas outlet 12 configured to discharge flue gas containing no sulfur (S) obtained through the inner chamber region C2. The slurry reservoir 20 for storing (receiving) a slurry containing an alkaline material is disposed under the chamber 10, and the first sprayer 30 and the second sprayer 35 are disposed in the outer chamber region C1 and the inner chamber region C2, respectively, to thus spray the alkaline slurry to the flue gas in order to remove sulfur from the flue gas. Furthermore, the demister 40 for removing mist from the flue gas subjected to desulfurization through the second sprayer 35 is disposed at the upper end of the inner chamber region C2. Here, both the inner chamber region C2 and the outer chamber region C1 are preferably provided in a cylindrical shape. Specifically, the inner chamber region C2 and the outer chamber region C1 are provided in a cylindrical shape, and the flue gas inlet 11 is formed in the tangential direction of the outer chamber region C1, and thus the flue gas introduced via the flue gas inlet 11 is allowed to rotate in the inner space of the outer chamber region C1 while enclosing the outer surface of the inner chamber region C2, whereby the flue gas may stay in the outer chamber region C1 for a long period of time and may be subjected to desulfurization for a relatively long period of time.

Referring to FIG. 2, wherein volume is indicated by shading, the volume V2 of the inner chamber region C2 is preferably greater than the volume V1 of the outer chamber region C1. When the flow rate of the flue gas that is introduced to the inside of the chamber 10 is constant, if the volume is relatively large, a slow flow is formed. Since the flue gas that is initially introduced via the flue gas inlet 11 contains a large amount of sulfur, even when the flue gas moves at a relatively high rate (that is, the gas-liquid contact time is short), a large amount of sulfur may be removed. However, in the case where the flue gas subjected to primary desulfurization in the outer chamber region C1 is introduced to the inner chamber region C2 and moves quickly, it is not easy to remove the remaining sulfur. Thus, when the volume V2 of the inner chamber region C2 is greater than the volume V1 of the outer chamber region C1, the flow rate of the flue gas in the inner chamber region C2 is preferably decreased to thus ensure sufficient gas-liquid contact time, thereby improving desulfurization efficiency.

The slurry reservoir 20 may include a slurry supply pipe 21 for supplying a slurry containing an alkaline material, which may be referred to as an "alkaline slurry," and receives and stores the alkaline slurry. Here, examples of the alkaline material may include, but are not limited to, limestone ($CaCO_3$), slaked lime ($Ca(OH)_2$), ammonia ($NH_3$), and sodium hydroxide (NaOH). Taking into consideration economic efficiency and productivity, limestone ($CaCO_3$) is preferably used. The pH of the alkaline slurry stored in the slurry reservoir 20 may be adjusted depending on the desulfurization efficiency or the quality of gypsum that is produced, and is preferably set to the range of 4.5 to 6.0.

Also, the slurry reservoir 20 may include an oxygen gas supply pipe 22 for supplying oxygen gas to the inside of the apparatus in order to produce gypsum, and an agitator 23 for stirring the alkaline slurry so as to make the pH of the stored alkaline slurry uniform.

The first sprayer 30 and the second sprayer 35 are disposed in the outer chamber region C1 and the inner chamber region C2, respectively, and may include spray pipes 31, 36 each having multiple spray nozzles 32, 37, whereby the alkaline slurry stored in the slurry reservoir 20 is supplied and sprayed to the flue gas, ultimately subjecting the flue gas to desulfurization. Here, in order to improve desulfurization efficiency, as shown in FIG. 3, the spray pipes 31, 36 are preferably formed in a multi-tiered structure in a vertical direction. The spray pipes are preferably provided in the form of a multi-tiered structure in order to spray a large amount of slurry, and are preferably disposed so that the spray paths of the spray nozzles 32, 37 do not overlap each other.

The demister 40 is disposed at the upper end of the inner chamber region C2, thus removing mist from flue gas containing no sulfur obtained through the second sprayer 35.

Referring to FIG. 4, the demister 40 according to an exemplary embodiment may include an upper support frame 41 fixed to the inner wall of the inner chamber region C2, a lower support frame 42 fixed to the inner wall of the inner chamber region C2, and a plurality of corrugated plates 43, joined to the upper support frame 41 and the lower support frame 42 while the corrugated plates are spaced apart from each other, and configured to have multiple S-shaped waves. Here, each of the corrugated plates 43 includes a series of ridges (crests) and grooves (valleys) formed by a crest plate 44 extending vertically and protruding in a first direction, a valley plate 45 extending vertically and protruding in the opposite direction, a plate fastener 47 extending vertically to fasten the upper end of the corrugated plate 43 to the upper support frame 41 and to fasten the lower end of the corrugated plate 43 to the lower support frame 42, and a plurality of coupling plates 46 extending obliquely to couple the plate fastener 47 to each of the crest plate 44 and the valley plate 45 and to couple the crest plate 44 and the valley plate 45 to each other. The corrugated plates 43 are configured such that the vertical plates and the oblique plates are alternately connected, whereby the flue gas is naturally guided upwards to thus efficiently pass therethrough, and the mist may be blocked so as to collide therewith or be attached thereto and may thus be removed. Specifically, the flue gas passes through the gaps between these corrugated plates 43, but the mist contained in the flue gas flows into the gaps between the corrugated plates 43 and collides with the ridges and grooves of corrugation and thus drops to the lower portion of the desulfurization apparatus, or may be attached to the corrugated plates 43, and the attached mist accumulates and flows down along the vertical planes of the vertical plates and the downward slopes of the oblique plates due to gravity, and thus drops to the lower portion of the desulfurization apparatus, thereby increasing mist removal efficiency.

Also, as shown in FIG. 5, the demister 40 may include a demisting pipe 48, which is disposed above the upper support frame 41, has multiple spray nozzles 49, and receives the alkaline slurry from the slurry reservoir 20 to thus spray the alkaline slurry downwards, thus removing mist attached to the upper support frame 41, the lower support frame 42 and the corrugated plates 43. The alkaline slurry is sprayed, whereby mist attached to the corrugated plates 43 and the like is removed and also untreated sulfur in the flue gas may be removed.

In an embodiment of the present invention, as shown in FIG. 6, the wet desulfurization apparatus of the present invention may further comprise a slurry transfer controller 50 for controlling the amount of the alkaline slurry that is transferred to at least one of the first sprayer 30, the second sprayer 35 and the demister 40 from the slurry reservoir 20. In particular, when the spray pipes 31, 36 of the first sprayer 30 and the second sprayer 35 are formed in a multi-tiered structure and when the demister 40 includes the demisting pipe 48, the slurry transfer controller 50 is able to control the amount of the slurry that is transferred to each pipe, thereby improving desulfurization efficiency. Here, it is important to adjust the amount of the slurry that is sprayed to the inner chamber region C2 where the flue gas forms an ascending air current. Although the flue gas forms a descending air current in the outer chamber region C1 and may thus sufficiently come into contact with the sprayed slurry, the flue gas forms an ascending air current in the inner chamber region C2 and thus desulfurization efficiency may be improved through contact between the flue gas and the slurry under the condition that the slurry is sprayed in a larger amount to the upper portion of the inner chamber region, where the sulfur concentration gradually decreases. Accordingly, when the spray pipe 36 of the second sprayer 35 is formed in a multi-tiered structure, the spray pipe 36 at the lowermost position sprays the slurry to the flue gas having relatively high sulfur content to thus supply the smallest amount of slurry (represented as the thinnest line), and the spray pipe 36 at the uppermost position sprays the slurry to the flue gas having relatively low sulfur content to thus supply the largest amount of slurry (represented as the thickest line).

The slurry supplied through the demisting pipe 48 has a major function of removing the mist attached to the corrugated plates 43 and the like and a minor function of removing the remaining sulfur, and is thus preferably supplied in an intermittent manner (represented as a dotted line) taking into account economic efficiency.

Next, a wet desulfurization method using the aforementioned wet desulfurization apparatus is described. Since the aforementioned wet desulfurization apparatus is used to perform the wet desulfurization method, a redundant description thereof is omitted.

According to an embodiment of the present invention, a wet desulfurization method using the aforementioned wet desulfurization apparatus comprises: (1) introducing flue gas containing sulfur (S) to an outer chamber region C1 via a flue gas inlet 11; (2) supplying an alkaline slurry stored in a slurry reservoir 20 to a first sprayer 30; (3) removing sulfur (S) by spraying the alkaline slurry from the first sprayer 30 to the flue gas that is introduced to the outer chamber region C1 via the flue gas inlet 11 and forms a descending air current; (4) supplying the alkaline slurry stored in the slurry reservoir 20 to a second sprayer 35; (5) removing sulfur (S) by spraying the alkaline slurry from the second sprayer 35 to the flue gas that is introduced to an inner chamber region C2 via the outer chamber region C1 and forms an ascending air current; (6) removing mist from flue gas containing no sulfur (S) using a demister 40; and (7) discharging flue gas containing neither sulfur (S) nor mist.

In the present invention, the chamber 10 includes the inner chamber region C2 and the outer chamber region C1 partitioned by means of a tubular barrier 13, and the flow rate of flue gas and the amount of alkaline slurry that is sprayed are adjusted during desulfurization, thereby improving desulfurization efficiency. Specifically, a contemporary wet desulfurization apparatus has a single path in an upward direction, whereas the wet desulfurization apparatus of the present invention is configured such that the introduced flue gas is subjected to primary desulfurization in a descending air current and is then subjected to secondary desulfurization in an ascending air current, thereby improving desulfurization efficiency.

In step (1), the flue gas is introduced. Specifically, the flue gas inlet 11 is formed so as to be connected to the outer chamber region C1, whereby the flue gas containing sulfur (S) is introduced to the outer chamber region C1 via the flue gas inlet 11 and forms a descending air current. Here, the inner chamber region C2 and the outer chamber region C1 are formed in a cylindrical shape, and the flue gas is introduced in the tangential direction of the outer chamber region C1, and thus the flue gas is allowed to rotate and descend in the inner space of the outer chamber region C1 while enclosing the outer surface of the inner chamber region C2, whereby the flue gas may be subjected to desulfurization for a relatively long period of time.

In step (2), the alkaline slurry stored in the slurry reservoir 20 is supplied to the first sprayer 30. Here, the pH of the alkaline slurry falls in the range of 4.5 to 6.0.

In step (3), the alkaline slurry supplied to the first sprayer 30 is sprayed to the flue gas that forms a descending air current, whereby the flue gas is subjected to desulfurization. In order to improve desulfurization efficiency, the first sprayer 30 sprays the alkaline slurry supplied from the slurry reservoir 20 using a spray pipe 31 having multiple spray nozzles 32, and the spray pipe 31 is preferably formed in a multi-tiered structure in the vertical direction of the outer chamber region C1. Furthermore, the flow rate of the flue gas that forms a descending air current in step (3) may be higher than the flow rate of the flue gas that forms an ascending air current in step (5), which will be described later. This is because the flue gas introduced to the outer chamber region C1 has relatively high sulfur content, thus facilitating desulfurization thereof.

In step (4), the alkaline slurry stored in the slurry reservoir 20 is supplied to the second sprayer 35. Here, the pH of the alkaline slurry falls in the range of 4.5 to 6.0.

In step (5), the alkaline slurry supplied to the second sprayer 35 is sprayed to the flue gas that is introduced to the inner chamber region C2 through the outer chamber region C1 and forms an ascending air current, thus subjecting the flue gas to desulfurization. In order to improve desulfurization efficiency, the second sprayer 35 sprays the alkaline slurry supplied from the slurry reservoir 20 using a spray pipe 36 having multiple spray nozzles 37, and the spray pipe 36 is preferably formed in a multi-tiered structure in the vertical direction of the inner chamber region C2. Moreover, in order to further improve desulfurization efficiency, it is preferred that control be performed so that the largest amount of slurry is transferred to the spray pipe 36 at the uppermost position and the smallest amount of slurry is transferred to the spray pipe 36 at the lowermost position. Briefly, a small amount of slurry is sprayed to the flue gas having relatively high sulfur content and a large amount of slurry is sprayed to the flue gas having relatively low sulfur content, thus improving desulfurization efficiency.

In step (5), the flow rate of the flue gas that forms an ascending air current is preferably lower than the flow rate of the flue gas that forms a descending air current in step (3). The flue gas passing through the inner chamber region C2 contains almost no sulfur due to primary desulfurization, and thus, in the case where desulfurization is carried out under the same conditions as in the outer chamber region C1, it is not easy to remove the remaining sulfur. Hence, the volume V2 of the inner chamber region C2 is set to be greater than the volume V1 of the outer chamber region C1, whereby the flow rate of the flue gas decreases and the gas-liquid contact time increases, ultimately improving desulfurization efficiency.

In step (6), the mist is removed from the flue gas containing no sulfur using the demister 40. An upper support frame 41, a lower support frame 42, and corrugated plates 43 are disposed to thus induce physical collisions with the flue gas, after which the mist is attached to the corrugated plates 43 and the like, thereby removing the mist from the flue gas.

In step (7), the flue gas, the desulfurization of which is completed, is discharged, and the discharged flue gas may be transported to a subsequent treatment facility such as an electrostatic precipitator or similar equipment.

Next, another type of wet desulfurization apparatus and a wet desulfurization method using the same will be described.

Figure 7:
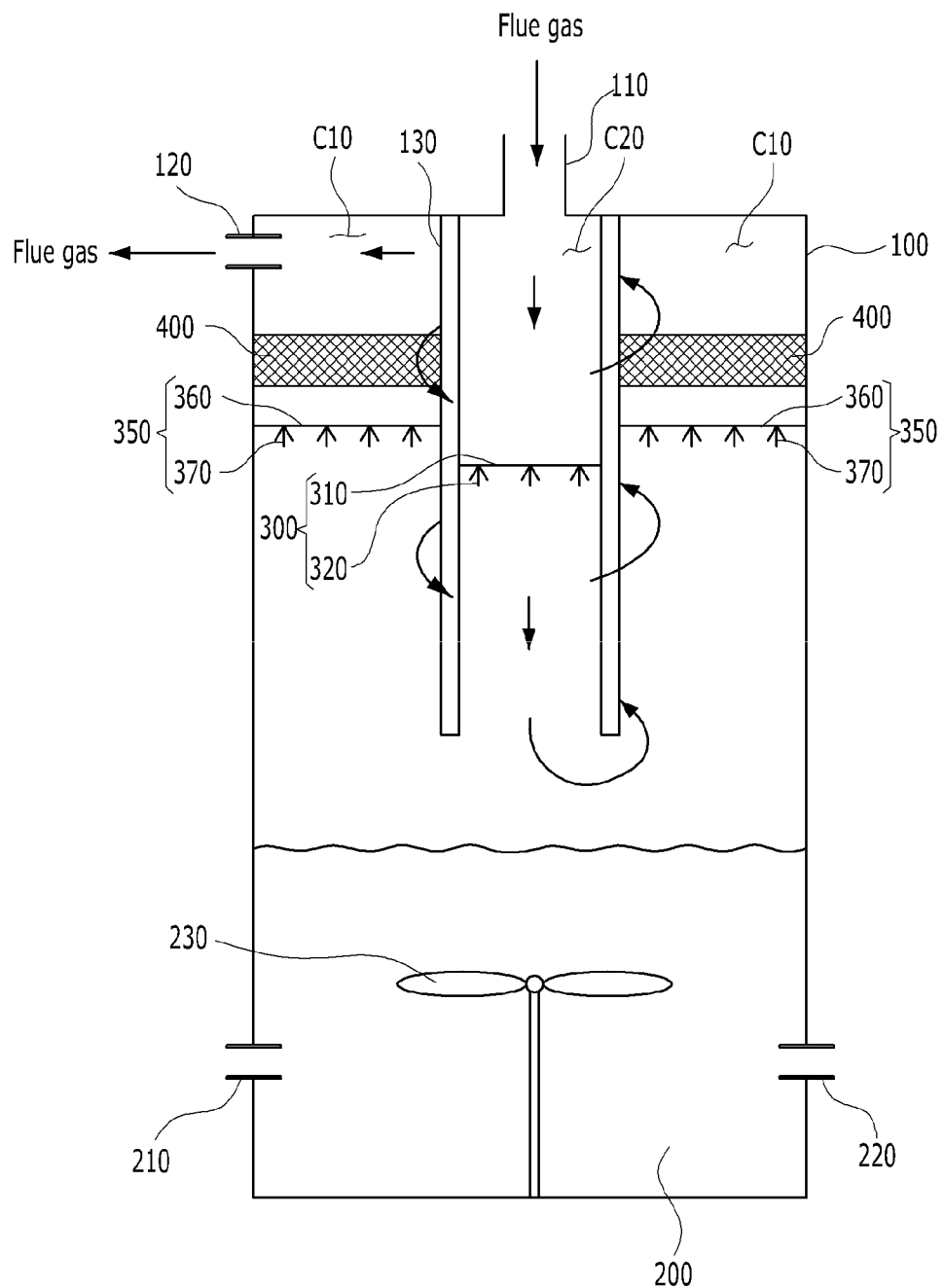
FIG. 7 is a schematic cross-section of a wet desulfurization apparatus according to an embodiment of the present invention.
Figure 8:
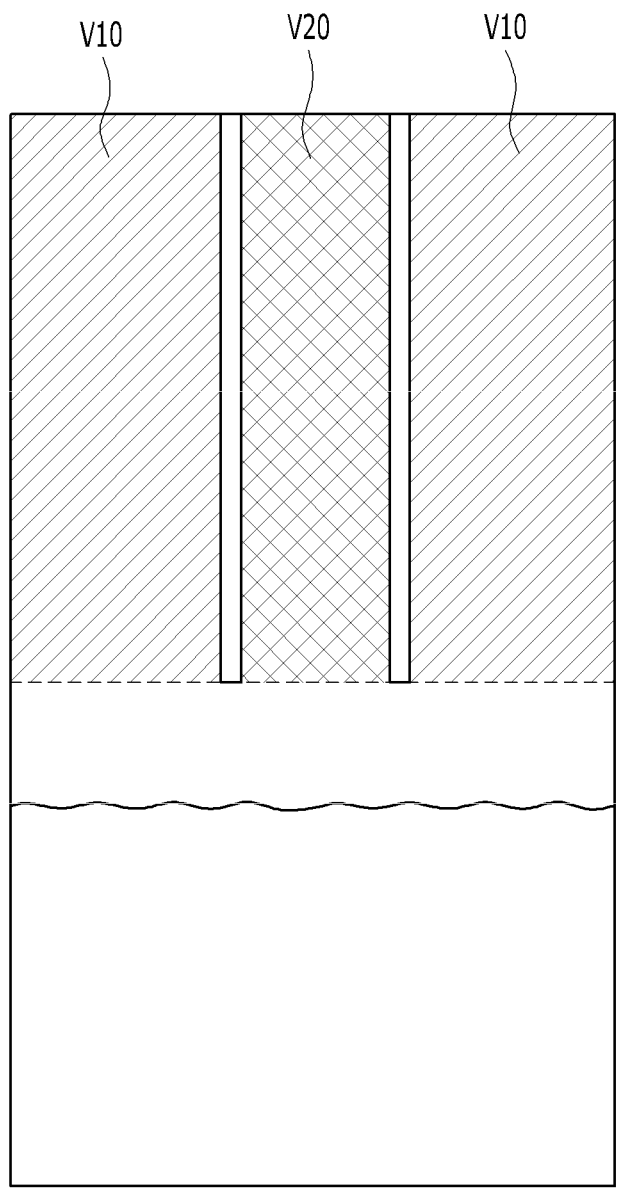
FIG. 8 is a schematic cross section of the chamber of FIG. 7 partitioned according to an exemplary embodiment.
Figure 9:
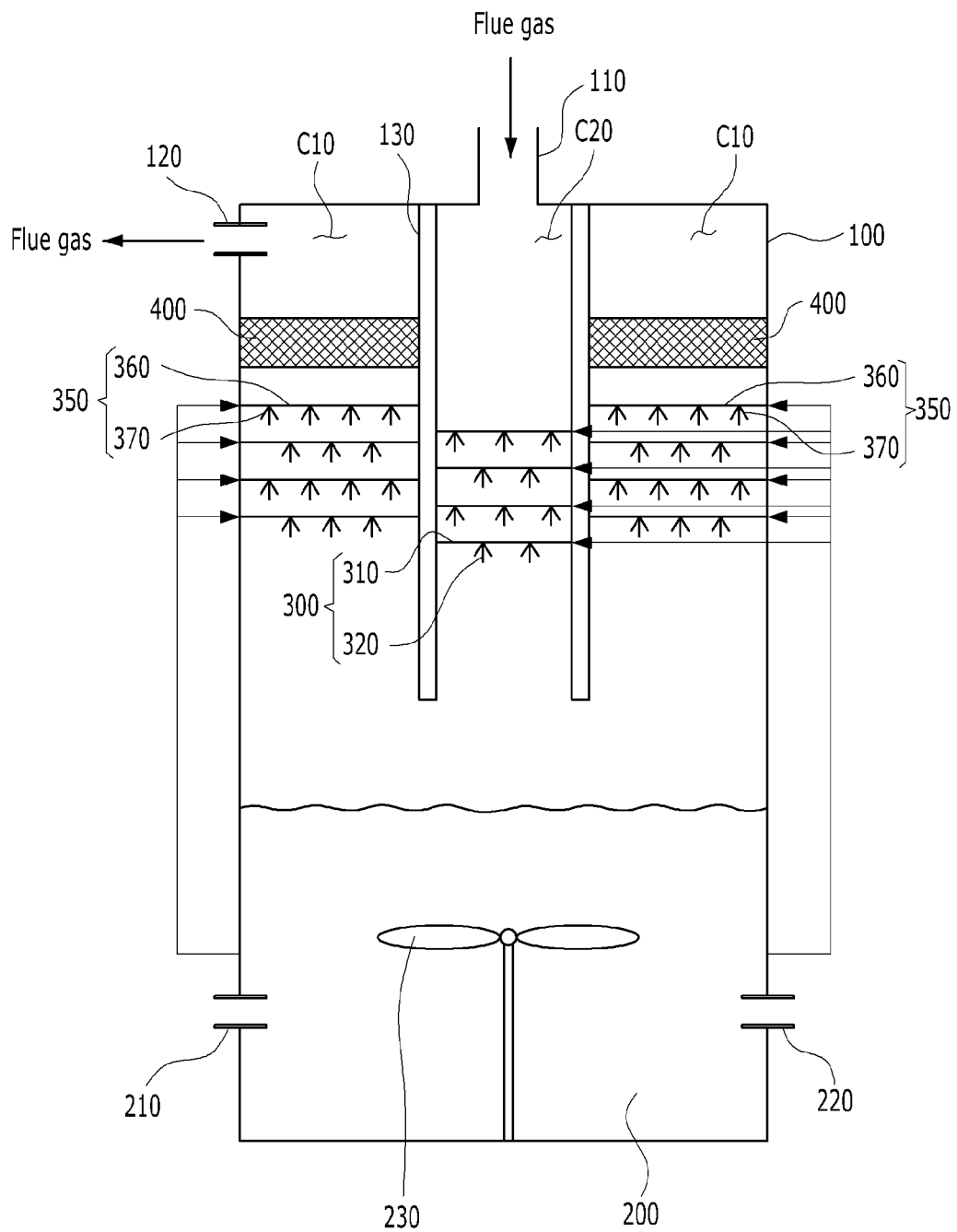
FIG. 9 is a schematic cross-section of a wet desulfurization apparatus according to an embodiment of the present invention.
Figure 10:
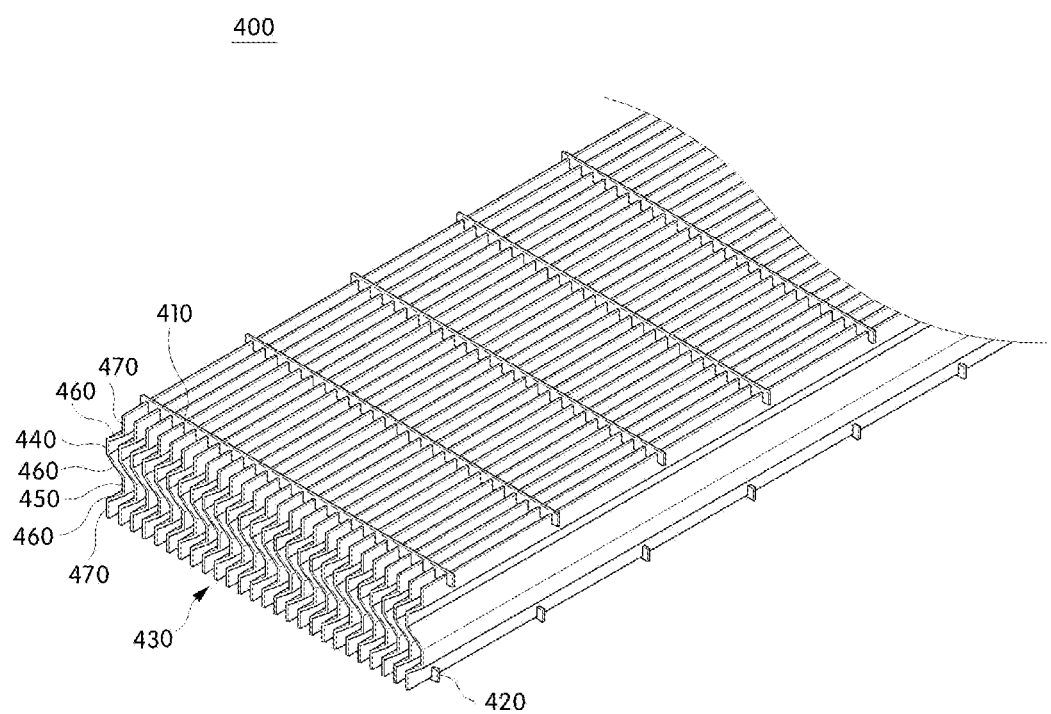
FIG. 10 is a perspective view of the demister of FIG. 7.
Figure 11:
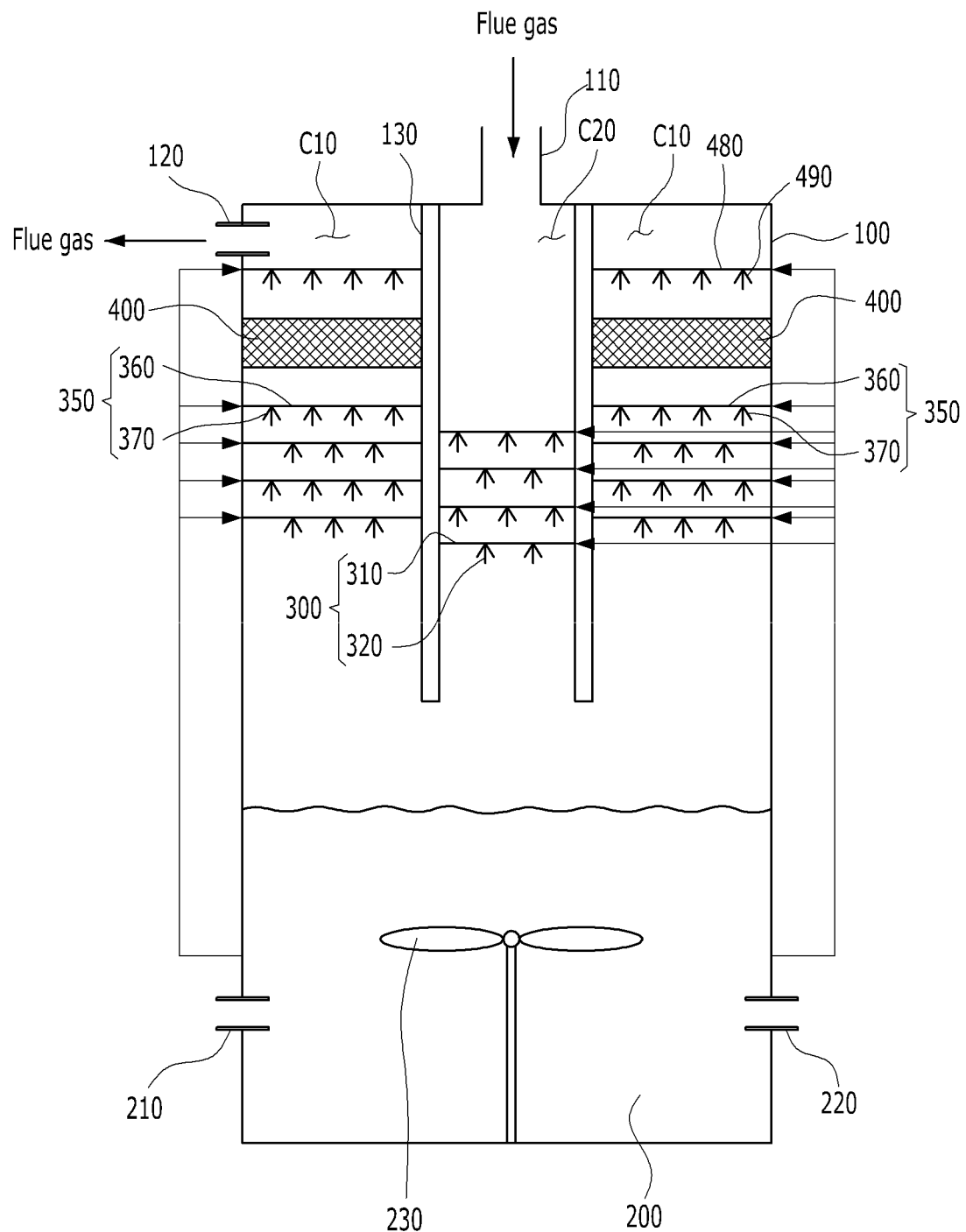
FIG. 11 is a schematic cross-section of a wet desulfurization apparatus according to an embodiment of the present invention.
Figure 12:
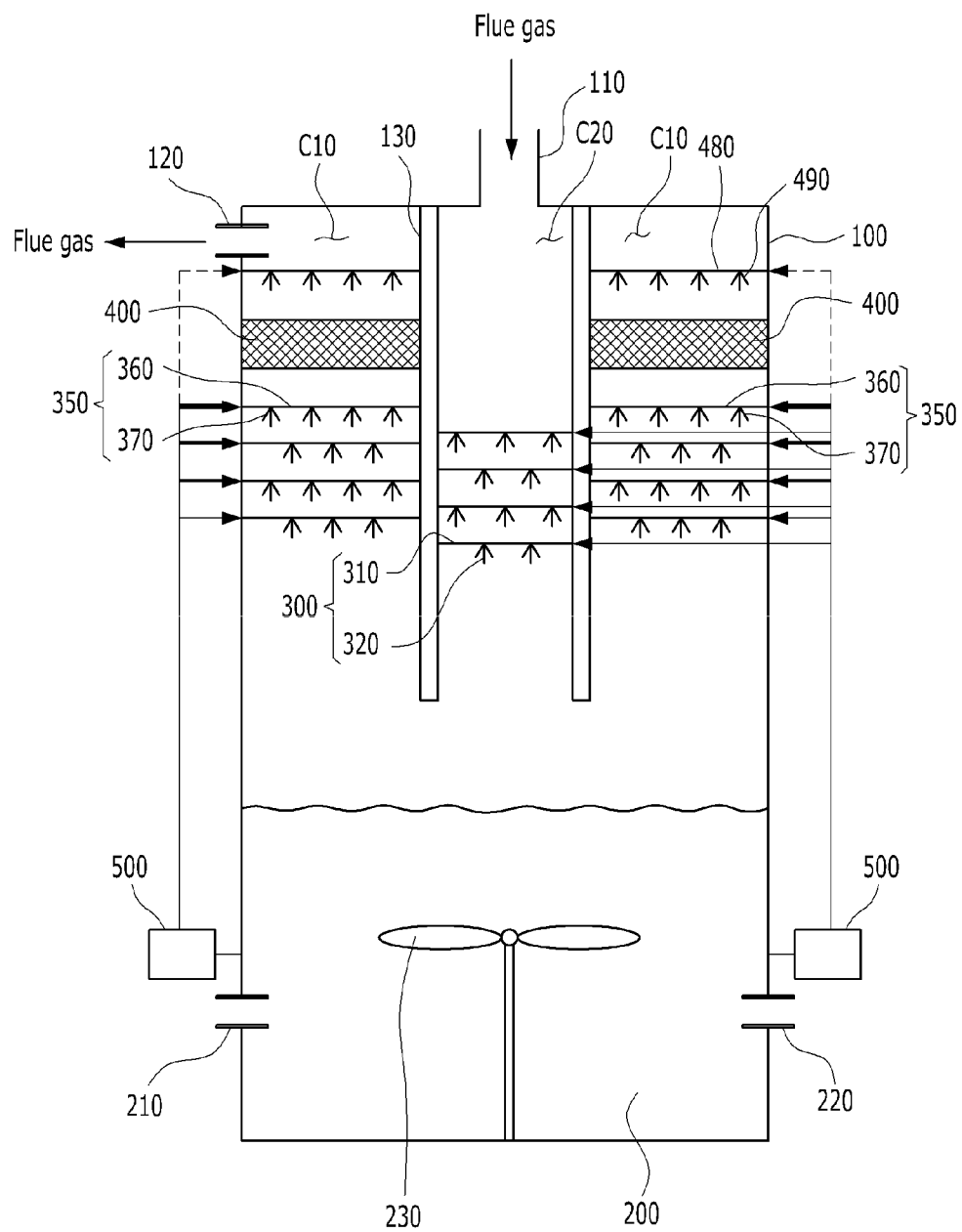
FIG. 12 is a schematic cross-section of a wet desulfurization apparatus according to an embodiment of the present invention.

That is, FIGS. 7-12 illustrate a wet desulfurization apparatus according to a second embodiment of the present invention, with modifications of the second embodiment being shown in FIGS. 9, 11, and 12.

Referring to FIG. 7, the wet desulfurization apparatus according to the present invention may include: a chamber 100 enclosing an inner space and including a tubular barrier 130 for partitioning the inner space into an inner chamber region C20 and an outer chamber region C10, a flue gas inlet 110 for introducing flue gas containing sulfur (S) to the inner chamber region C20, and a flue gas outlet 120 for discharging flue gas containing no sulfur (S) obtained through the outer chamber region C10; a slurry reservoir 200 disposed under the chamber 100 and configured to receive and store an alkaline slurry; a first sprayer 300 disposed in the inner chamber region C20 and configured to receive the alkaline slurry stored in the slurry reservoir 200 so as to spray the alkaline slurry to the flue gas; a second sprayer 350 disposed in the outer chamber region C10 and configured to receive the alkaline slurry stored in the slurry reservoir 200 so as to spray the alkaline slurry to the flue gas; a demister 400 disposed at the upper end of the outer chamber region C10 and configured to remove mist from flue gas containing no sulfur (S) obtained through the second sprayer 350, in which the flue gas containing sulfur is introduced to the flue gas inlet 110, sequentially passes through the inner chamber region C20 and the outer chamber region C10, and is then discharged from the flue gas outlet 120. Here, the cross section of the tubular bather 130 is preferably circular but may be polygonal and may conform to the shape of the chamber 100.

In the present invention, the chamber 100 is configured to include the inner chamber region C20 and the outer chamber region C10, partitioned by means of the tubular barrier 130, and the flow rate of flue gas and the amount of alkaline slurry that is sprayed are adjusted during desulfurization, thereby improving desulfurization efficiency. Specifically, a contemporary wet desulfurization apparatus has a single path in an upward direction, whereas the wet desulfurization apparatus of the present invention is configured such that the introduced flue gas is subjected to primary desulfurization in a descending air current and is then subjected to secondary desulfurization in an ascending air current, thereby increasing desulfurization efficiency.

The chamber 100 includes the inner chamber region C20 and the outer chamber region C10 and is partitioned by the tubular barrier 130 arranged in a vertical direction (the up-and-down direction in FIG. 7). The chamber 100 further includes the flue gas inlet 110 configured to introduce flue gas containing sulfur (S) to the inner chamber region C20, and the flue gas outlet 120 configured to discharge flue gas containing no sulfur (S) obtained through the outer chamber region C10. The slurry reservoir 200 for storing (receiving) a slurry containing an alkaline material is disposed under the chamber 100, and the first sprayer 300 and the second sprayer 350 are disposed in the inner chamber region C20 and the outer chamber region C10, respectively, to thus spray the alkaline slurry to the flue gas in order to remove sulfur from the flue gas. Furthermore, the demister 400 for removing mist from the flue gas subjected to desulfurization through the second sprayer 350 is disposed at the upper end of the outer chamber region C10. Here, both the inner chamber region C20 and the outer chamber region C10 are preferably provided in the form of a cylindrical shape. Specifically, the inner chamber region C20 and the outer chamber region C10 are provided in a cylindrical shape, and the flue gas outlet 120 is formed in the tangential direction of the outer chamber region C10, and thus the flue gas introduced via the flue gas inlet 110 and subjected to primary desulfurization is allowed to rotate in the inner space of the outer chamber region C10 while enclosing the outer surface of the inner chamber region C20, whereby the flue gas may stay in the outer chamber region C10 for a long period of time and may be subjected to desulfurization for a relatively long period of time.

Referring to FIG. 8, wherein volume is indicated by shading, the volume V10 of the outer chamber region C10 is preferably greater than the volume V20 of the inner chamber region C20. When the flow rate of the flue gas that is introduced to the inside of the chamber 100 is constant, if the volume is relatively large, a slow flow is formed. Since the flue gas that is initially introduced via the flue gas inlet 110 contains a large amount of sulfur, even when the flue gas moves at a relatively high rate (that is, the gas-liquid contact time is short), a large amount of sulfur may be removed. However, in the case where the flue gas subjected to primary desulfurization in the inner chamber region C20 is introduced to the outer chamber region C10 and moves quickly, it is not easy to remove the remaining sulfur. Thus, when the volume V10 of the outer chamber region C10 is greater than the volume V20 of the inner chamber region C20, the flow rate of the flue gas in the outer chamber region C10 is preferably decreased to thus ensure sufficient gas-liquid contact time, thereby improving desulfurization efficiency.

The slurry reservoir 200 may include a slurry supply pipe 210 for supplying a slurry containing an alkaline material, which may be referred to as an "alkaline slurry," and receives and stores the alkaline slurry. Here, examples of the alkaline material may include, but are not limited to, limestone ($CaCO_3$), slaked lime ($Ca(OH)_2$), ammonia ($NH_3$), and sodium hydroxide (NaOH). Taking into consideration economic efficiency and productivity, limestone ($CaCO_3$) is preferably used. The pH of the alkaline slurry stored in the slurry reservoir 200 may be adjusted depending on the desulfurization efficiency or the quality of gypsum that is produced, and is preferably set to the range of 4.5 to 6.0.

Also, the slurry reservoir 200 may include an oxygen gas supply pipe 220 for supplying oxygen gas to the inside of the apparatus in order to produce gypsum, and an agitator 230 for stirring the alkaline slurry so as to make the pH of the stored alkaline slurry uniform.

The first sprayer 300 and the second sprayer 350 are disposed in the inner chamber region C20 and the outer chamber region C10, respectively, and may include spray pipes 310, 360 each having multiple spray nozzles 320, 370, whereby the alkaline slurry stored in the slurry reservoir 200 is supplied and sprayed to the flue gas, ultimately subjecting the flue gas to desulfurization. Here, in order to improve desulfurization efficiency, as shown in FIG. 9, the spray pipes 310, 360 are preferably formed in a multi-tiered structure in a vertical direction. The spray pipes are preferably provided in the form of a multi-tiered structure in order to spray a large amount of slurry, and are preferably disposed so that the spray paths of the spray nozzles 320, 370 do not overlap each other.

The demister 400 is disposed at the upper end of the outer chamber region C10, thus removing mist from flue gas containing no sulfur obtained through the second sprayer 350.

Referring to FIG. 10, the demister 400 according to an exemplary embodiment may include an upper support frame 410 fixed to the inner wall of outer chamber region C10, a lower support frame 420 fixed to the inner wall of outer chamber region C10, and a plurality of corrugated plates 430, joined to the upper support frame 410 and the lower support frame 420 while the corrugated plates are spaced apart from each other, and configured to have multiple S-shaped waves. Here, each of the corrugated plates 430 includes a series of ridges (crests) and grooves (valleys) formed by a crest plate 440 extending vertically and protruding in a first direction, a valley plate 450 extending vertically and protruding in the opposite direction, a plate fastener 470 extending vertically to fasten the upper end of the corrugated plate 430 to the upper support frame 410 and to fasten the lower end of the corrugated plate 430 to the lower support frame 420, and a plurality of coupling plates 460 extending obliquely to couple the plate fastener 470 to each of the crest plate 440 and the valley plate 450 and to couple the crest plate 440 and the valley plate 450 to each other. The corrugated plates 430 are configured such that the vertical plates and the oblique plates are alternately connected, whereby the flue gas is naturally guided upwards to thus efficiently pass therethrough, and the mist may be blocked so as to collide therewith or be attached thereto and may thus be removed. Specifically, the flue gas passes through the gaps between these corrugated plates 430, but the mist contained in the flue gas flows into the gaps between the corrugated plates 430 and collides with the ridges and grooves of corrugation and thus drops to the lower portion of the desulfurization apparatus, or may be attached to the corrugated plates 430, and the attached mist accumulates and flows down along the vertical planes of the vertical plates and the downward slopes of the oblique plates due to gravity, and thus drops to the lower portion of the desulfurization apparatus, thereby increasing mist removal efficiency.

Also, as shown in FIG. 11, the demister 400 may include a demisting pipe 480, which is disposed above the upper support frame 410, has multiple spray nozzles 490, and receives the alkaline slurry from the slurry reservoir 200 to thus spray the alkaline slurry downwards, thus removing mist attached to the upper support frame 410, the lower support frame 420 and the corrugated plates 430. The alkaline slurry is sprayed, whereby mist attached to the corrugated plates 430 and the like is removed and also untreated sulfur in the flue gas may be removed.

In an embodiment of the present invention, as shown in FIG. 12, the wet desulfurization apparatus of the present invention may further comprise a slurry transfer controller 500 for controlling the amount of the alkaline slurry that is transferred to at least one of the first sprayer 300, the second sprayer 350 and the demister 400 from the slurry reservoir 200. In particular, when the spray pipes 310, 360 of the first sprayer 300 and the second sprayer 350 are formed in a multi-tiered structure and when the demister 400 includes the demisting pipe 480, the slurry transfer controller 500 is able to control the amount of slurry that is transferred to each pipe, thereby improving desulfurization efficiency. Here, it is important to adjust the amount of the slurry that is sprayed to the outer chamber region C10 where the flue gas forms an ascending air current. Although the flue gas forms a descending air current in the inner chamber region C20 and may thus sufficiently come into contact with the sprayed slurry, the flue gas forms an ascending air current in the outer chamber region C10 and thus desulfurization efficiency may be improved through contact between the flue gas and the slurry under the condition that the slurry is sprayed in a larger amount to the upper portion of the outer chamber region, where the sulfur concentration gradually decreases. Accordingly, when the spray pipe 360 of the second sprayer 350 is formed in a multi-tiered structure, the spray pipe 360 at the lowermost position sprays the slurry to the flue gas having relatively high sulfur content to thus supply the smallest amount of slurry (represented as the thinnest line), and the spray pipe 360 at the uppermost position sprays the slurry to the flue gas having relatively low sulfur content to thus supply the largest amount of slurry (represented as the thickest line).

The slurry supplied through the demisting pipe 480 has a major function of removing the mist attached to the corrugated plates 430 and the like and a minor function of removing the remaining sulfur, and is thus preferably supplied in an intermittent manner (represented as a dotted line) taking into account economic efficiency.

Next, a wet desulfurization method using the aforementioned wet desulfurization apparatus is described. Since the aforementioned wet desulfurization apparatus is used to perform the wet desulfurization method, a redundant description thereof is omitted.

According to an embodiment of the present invention, a wet desulfurization method using the aforementioned wet desulfurization apparatus comprises: (A) introducing flue gas containing sulfur (S) to an inner chamber region C20 via a flue gas inlet 110; (B) supplying an alkaline slurry stored in a slurry reservoir 200 to a first sprayer 300; (C) removing sulfur (S) by spraying the alkaline slurry from the first sprayer 300 to the flue gas that is introduced to the inner chamber region C20 via the flue gas inlet 110 and forms a descending air current; (D) supplying the alkaline slurry stored in the slurry reservoir 200 to a second sprayer 350; (E) removing sulfur (S) by spraying the alkaline slurry from the second sprayer 350 to the flue gas that is introduced to an outer chamber region C10 via the inner chamber region C20 and forms an ascending air current; (F) removing mist from flue gas containing no sulfur (S) using a demister 400; and (G) discharging flue gas containing neither sulfur (S) nor mist.

In the present invention, the chamber 100 includes the inner chamber region C20 and the outer chamber region C10, partitioned by means of a tubular barrier 130, and the flow rate of flue gas and the amount of alkaline slurry that is sprayed are adjusted during desulfurization, thereby improving desulfurization efficiency. Specifically, a contemporary wet desulfurization apparatus has a single path in an upward direction, whereas the wet desulfurization apparatus of the present invention is configured such that the introduced flue gas is subjected to primary desulfurization in a descending air current and is then subjected to secondary desulfurization in an ascending air current, thereby improving desulfurization efficiency.

In step (A), the flue gas is introduced. Specifically, the flue gas inlet 110 is formed so as to be connected to the inner chamber region C20, whereby the flue gas containing sulfur (S) is introduced to the inner chamber region C20 via the flue gas inlet 110 and forms a descending air current.

In step (B), the alkaline slurry stored in the slurry reservoir 200 is supplied to the first sprayer 300. Here, the pH of the alkaline slurry falls in the range of 4.5 to 6.0.

In step (C), the alkaline slurry supplied to the first sprayer 300 is sprayed to the flue gas that forms a descending air current, whereby the flue gas is subjected to desulfurization. In order to improve desulfurization efficiency, the first sprayer 300 sprays the alkaline slurry supplied from the slurry reservoir 200 using a spray pipe 310 having multiple spray nozzles 320, and the spray pipe 310 is preferably formed in a multi-tiered structure in the vertical direction of the inner chamber region C20. Furthermore, the flow rate of the flue gas that forms a descending air current in step (C) may be higher than the flow rate of the flue gas that forms an ascending air current in step (E), which will be described later. This is because the flue gas introduced to the inner chamber region C20 contains sulfur in a relatively large amount to thus facilitate desulfurization thereof.

In step (D), the alkaline slurry stored in the slurry reservoir 200 is supplied to the second sprayer 350. Here, the pH of the alkaline slurry falls in the range of 4.5 to 6.0.

In step (E), the alkaline slurry supplied to the second sprayer 350 is sprayed to the flue gas that is introduced to the outer chamber region C10 through the inner chamber region C20 and forms an ascending air current, thus subjecting the flue gas to desulfurization. In order to improve desulfurization efficiency, the second sprayer 350 sprays the alkaline slurry supplied from the slurry reservoir 200 using a spray pipe 360 having multiple spray nozzles 370, and the spray pipe 360 is preferably formed in a multi-tiered structure in the vertical direction of the outer chamber region C10. Moreover, in order to further improve desulfurization efficiency, it is preferred that control be performed so that the largest amount of slurry is transferred to the spray pipe 360 at the uppermost position and the smallest amount of slurry is transferred to the spray pipe 360 at the lowermost position. Briefly, a small amount of slurry is sprayed to the flue gas having relatively high sulfur content and a large amount of slurry is sprayed to the flue gas having relatively low sulfur content, thus improving desulfurization efficiency.

Here, the inner chamber region C20 and the outer chamber region C10 are formed in a cylindrical shape, and the flue gas outlet is provided in the tangential direction of the outer chamber region C10, and thus the flue gas introduced to the outer chamber region C10 via the inner chamber region C20 is allowed to rotate and ascend in the inner space of the outer chamber region C10 while enclosing the outer surface of the inner chamber region C20, whereby the flue gas may be subjected to desulfurization for a relatively long period of time.

In step (E), the flow rate of the flue gas that forms an ascending air current is preferably lower than the flow rate of the flue gas that forms a descending air current in step (C). The flue gas passing through the outer chamber region C10 contains almost no sulfur due to primary desulfurization, and thus, in the case where desulfurization is carried out under the same conditions as in the inner chamber region C20, it is not easy to remove the remaining sulfur. Hence, the volume V10 of the outer chamber region C10 is set to be greater than the volume V20 of the inner chamber region C20, whereby the flow rate of the flue gas decreases and the gas-liquid contact time increases, ultimately improving desulfurization efficiency.

In step (F), the mist is removed from the flue gas containing no sulfur using the demister 400. An upper support frame 410, a lower support frame 420, and corrugated plates 430 are disposed to thus induce physical collisions with the flue gas, after which the mist is attached to the corrugated plates 430 and the like, thereby removing the mist from the flue gas.

In step (G), the flue gas, the desulfurization of which is completed, is discharged, and the discharged flue gas may be transported to a subsequent treatment facility such as an electrostatic precipitator or similar equipment.

In this specification, only a few examples of various embodiments performed by the present inventors are described, but the technical idea of the present invention is not limited thereto, and may be variously modified by those skilled in the art.

What is claimed is:

1. A wet desulfurization apparatus comprising:
   a chamber enclosing a space for passing flue gas and including a tubular barrier partitioning the space into an inner chamber region having a first volume and an outer chamber region surrounding the inner chamber region and having a second volume, a flue gas inlet configured to introduce raw flue gas into the outer chamber region, and a flue gas outlet configured to discharge desulfurized flue gas from the inner chamber region;

a slurry reservoir disposed under the chamber and configured to receive and store an alkaline slurry;

a first sprayer disposed in the outer chamber region and configured to receive the stored alkaline slurry and to spray the received alkaline slurry into the outer chamber region in order to remove sulfur (S) from the flue gas in the outer chamber region;

a second sprayer disposed in the inner chamber region and configured to receive the stored alkaline slurry and to spray the received alkaline slurry into the inner chamber region in order to remove sulfur (S) from the flue gas in the inner chamber region; and a demister disposed in the inner chamber region between the second sprayer and the flue gas outlet and configured to remove mist from the flue gas in the inner chamber region.

2. The wet desulfurization apparatus of claim 1, wherein the first volume is greater than the second volume.

3. The wet desulfurization apparatus of claim 1, wherein the second volume is greater than the first volume.

4. The wet desulfurization apparatus of claim 1, wherein the flue gas in the outer chamber region forms a descending air current that passes over the tubular barrier to form an ascending air current in the inner chamber region.

5. The wet desulfurization apparatus of claim 1, wherein the flue gas in the inner chamber region forms a descending air current that passes over the tubular barrier to form an ascending air current in the outer chamber region.

6. The wet desulfurization apparatus of claim 1, wherein each of the first and second sprayers includes a spray pipe communicating with the slurry reservoir and having multiple spray nozzles so as to spray the alkaline slurry supplied from the slurry reservoir.

7. The wet desulfurization apparatus of claim 1, wherein the demister comprises:
    an upper support frame fixed to an inner wall of the inner chamber region of the chamber;
    a lower support frame fixed to the inner wall of the inner chamber region of the chamber; and
    a plurality of corrugated plates spaced apart from each other, each corrugated plate having an upper end joined to the upper support frame and a lower end joined to the lower support frame.

8. The wet desulfurization apparatus of claim 1, wherein the demister comprises:
    a demisting pipe communicating with the slurry reservoir; and
    multiple spray nozzles disposed along the demisting pipe to spray the alkaline slurry downward in order to remove mist attached to the upper support frame, the lower support frame, and the corrugated plates.

9. The wet desulfurization apparatus of claim 1, wherein each of the corrugated plates comprises:
    a crest plate extending vertically and protruding in a first direction;
    a valley plate extending vertically and protruding in a second direction opposite to the first direction;
    a plate fastener extending vertically to fasten the upper end of the corrugated plate to the upper support frame and to fasten the lower end of the corrugated plate to the lower support frame; and
    a plurality of coupling plates extending obliquely to couple the plate fastener to each of the crest plate and the valley plate and to couple the crest plate and the valley plate to each other.

10. The wet desulfurization apparatus of claim 1, wherein the demister further comprises:
    a demisting pipe communicating with the slurry reservoir; and
    multiple spray nozzles disposed along the demisting pipe to spray the alkaline slurry downward in order to remove mist attached to the upper support frame, the lower support frame, and the corrugated plates.

11. The wet desulfurization apparatus of claim 1, further comprising a slurry transfer controller for controlling an amount of the alkaline slurry being transferred from the slurry reservoir to at least one of the first sprayer, the second sprayer, and the demister.

12. A method for removing sulfur (S) from flue gas using the wet desulfurization apparatus of claim 1, the method comprising:
    introducing raw flue gas into the outer chamber region to form a descending air current of the flue gas in the outer chamber region and to form an ascending air current of the flue gas in the inner chamber region that is introduced via the outer chamber region;
    first spraying the stored alkaline slurry into the outer chamber region, to remove sulfur from the flue gas forming the descending air current and having a first flow rate;
    second spraying the stored alkaline slurry into the inner chamber region, to remove sulfur from the flue gas forming the ascending air current and having a second flow rate; and
    removing mist from the flue gas that has undergone the second spraying.

13. The method of claim 12, wherein the first flow rate is higher than the second flow rate.

14. The method of claim 12, wherein the wet desulfurization apparatus further comprises a plurality of sprayers respectively communicating with the slurry reservoir and forming a multi-tiered structure arranged vertically in the inner chamber region along a flow direction of the flue gas in the inner chamber region, each sprayer configured to spray the received alkaline slurry into the inner chamber region in order to remove sulfur (S) from the flue gas in the inner chamber region, the method further comprising:
    controlling an amount of the alkaline slurry being transferred from the slurry reservoir to each sprayer such that a higher-positioned sprayer of the multi-tiered structure receives more alkaline slurry than a lower-positioned sprayer of the multi-tiered structure.

* * * * *